(12) United States Patent
Li et al.

(10) Patent No.: US 11,116,011 B2
(45) Date of Patent: Sep. 7, 2021

(54) CHANNEL ACCESS METHOD, ACCESS POINT AND STATION

(71) Applicant: ZTE CORPORATION, Guangdong (CN)

(72) Inventors: Nan Li, Guangdong (CN); Kaiying Lv, Guangdong (CN); Weimin Xing, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/761,062

(22) PCT Filed: Aug. 29, 2016

(86) PCT No.: PCT/CN2016/097191
§ 371 (c)(1),
(2) Date: Mar. 16, 2018

(87) PCT Pub. No.: WO2017/045521
PCT Pub. Date: Mar. 23, 2017

(65) Prior Publication Data
US 2018/0235014 A1    Aug. 16, 2018

(30) Foreign Application Priority Data
Sep. 17, 2015   (CN) .......................... 201510600874.5

(51) Int. Cl.
*H04W 74/08* (2009.01)
*H04W 72/00* (2009.01)

(52) U.S. Cl.
CPC ..... *H04W 74/0833* (2013.01); *H04W 72/005* (2013.01); *H04W 74/08* (2013.01)

(58) Field of Classification Search
None
See application file for complete search history.

(56) References Cited

U.S. PATENT DOCUMENTS

| 2011/0292897 A1* | 12/2011 | Wu ................... H04W 72/0486 370/329 |
| 2012/0163220 A1* | 6/2012 | Park ..................... H04W 28/08 370/252 |
| 2012/0224481 A1* | 9/2012 | Babiarz ............... H04L 43/0876 370/230.1 |

(Continued)

FOREIGN PATENT DOCUMENTS

| CN | 101711031 A | 5/2010 |
| CN | 102137413 A | 7/2011 |

(Continued)

OTHER PUBLICATIONS

International Search Report dated Nov. 25, 2016 for International Application No. PCT/CN2016/097191, 5 pages.

(Continued)

*Primary Examiner* — Anh Vu H Ly
(74) *Attorney, Agent, or Firm* — Perkins Coie LLP

(57) ABSTRACT

Provided are a channel access method, an access point (AP) and a station. The method includes that the access point sends a radio frame to a station. The radio frame carries a predefined identifier or a partial predefined identifier for indicating one or more Basic Service Sets (BSSs) in a BSS set of the access point.

26 Claims, 7 Drawing Sheets

Acquire a value m sent by the AP, where the value m is a maximum number of preset identifiers in a preset-identifier set — 400

Receive a radio frame sent by the AP, where the radio frame carries the preset identifier or the partial preset identifier for indicating the BSS in the BSS set of the AP — 401

(56) References Cited

U.S. PATENT DOCUMENTS

| | | | |
|---|---|---|---|
| 2012/0224483 A1* | 9/2012 | Babiarz | H04L 43/0847 370/232 |
| 2012/0224484 A1* | 9/2012 | Babiarz | H04L 41/5019 370/235 |
| 2012/0314636 A1* | 12/2012 | Liu | H04W 16/14 370/311 |
| 2013/0195018 A1* | 8/2013 | Lv | H04W 48/16 370/328 |
| 2014/0146678 A1* | 5/2014 | Merlin | H04L 47/12 370/235 |
| 2014/0211707 A1 | 7/2014 | Chen et al. | |
| 2014/0369301 A1* | 12/2014 | Wu | H04W 8/26 370/329 |
| 2015/0078299 A1 | 3/2015 | Barruac et al. | |
| 2015/0131435 A1* | 5/2015 | Kasslin | H04W 84/12 370/230 |
| 2015/0173075 A1* | 6/2015 | Choi | H04W 72/121 370/311 |
| 2015/0271665 A1* | 9/2015 | Lowenmark | H04L 5/0055 370/329 |
| 2015/0312753 A1* | 10/2015 | Asterjadhi | H04W 4/00 370/329 |
| 2015/0351115 A1* | 12/2015 | Jeon | H04W 48/16 455/450 |
| 2016/0183161 A1* | 6/2016 | Jeong | H04W 8/26 370/315 |
| 2016/0302185 A1* | 10/2016 | Sun | H04W 74/08 370/338 |
| 2017/0026981 A1* | 1/2017 | Cariou | H04W 72/1289 370/338 |
| 2017/0064713 A1* | 3/2017 | Barriac | H04W 72/0453 370/338 |
| 2017/0105143 A1* | 4/2017 | Seok | H04W 80/02 370/338 |
| 2018/0242355 A1* | 8/2018 | Lou | H04W 72/121 370/338 |
| 2018/0288743 A1* | 10/2018 | Choi | H04W 76/10 370/328 |
| 2019/0052353 A1* | 2/2019 | Kim | H04B 7/0452 |
| 2019/0124638 A1* | 4/2019 | Lim | H04L 1/00 370/328 |

FOREIGN PATENT DOCUMENTS

| | | |
|---|---|---|
| CN | 103002437 A | 3/2013 |
| EP | 3107345 B1 | 10/2019 |
| GB | 2 511 866 A | 9/2014 |
| WO | 2015042019 A1 | 3/2015 |
| WO | 2015131358 A1 | 9/2015 |

OTHER PUBLICATIONS

Written Opinion of the International Searching Authority dated Nov. 25, 2016 for International Application No. PCT/CN2016/097191, 3 pages.
European Search Report dated Mar. 6, 2019 for Application No. EP 16 84 5635, 7 pages.
Communication pursuant to Article 94(3) EPC as received in EP Patent Application No. 16845635.8, dated Jul. 12, 2021, 6 pages.

* cited by examiner

AP

| Physical layer signaling field (AID0, AID1, AIDx, AIDy) | Multicast and broadcast service of BSS0 | Acknowledgement request frame | Acknowledgement frame of STAx |
| --- | --- | --- | --- |
| | Multicast and broadcast service of BSS1 | | |
| | Downlink data of STAx (AIDx) | | |
| | Downlink data of STAy (AIDy) | | Acknowledgement frame of STAy |

STA

| Physical layer signaling field (AID0, AID1) | Triggering frame of BSS0 (STA1 STA2) | Uplink data of STA1 of BSS0 |
| --- | --- | --- |
| | | Uplink data of STA2 of BSS0 |
| | Triggering frame of BSS1 (STA1 STA2) | Uplink data of STA1 of BSS1 |
| | | Uplink data of STA2 of BSS1 |

STA

AP | Physical layer signaling field (AID15, AIDx, AIDy) | Multicast and broadcast service of BSS0 to BSS3 / Downlink data of STAx (AIDx) / Downlink data of STAy (AIDy) | Acknowledgement request frame | Acknowledgement frame of STAx / Acknowledgement frame of STAy

STA

FIG. 8

AP | Physical layer signaling field (AID15, AID0) | Triggering frame of BSS0 to BSS3 (STA1 of BSS0, STA2 of BSS1) / Triggering frame of BSS0 (STA3 STA4) | Uplink data of STA1 of BSS0 / Uplink data of STA3 of BSS0 / Uplink data of STA4 of BSS0 / Uplink data of STA2 of BSS1

STA

FIG. 9

AP | Physical layer signaling field (AID0, AIDx) | Triggering frame of BSS0 (AID0, STA1 of BSS0) / Downlink data of STAx | Uplink data of station associated with BSS0 / Uplink data of STA1 of BSS0 / Acknowledgement frame of STAx

STA

AP

| Physical layer signaling field BSS color | Triggering frame of BSS0 to BSS3 (AID0, AID1, AID2) | Uplink data of station associated with BSS0 |
| | | Uplink data of station associated with BSS1 |
| | | Uplink data of station associated with BSS2 |

STA

CHANNEL ACCESS METHOD, ACCESS POINT AND STATION

CROSS REFERENCE TO RELATED APPLICATIONS

This application is the U.S. National Phase Application under 35 U.S.C. § 371 of International Application No. PCT/CN2016/097191 filed on Aug. 29, 2016, designating the U.S. and published as WO 2017/045521 A1 on Mar. 23, 2017, which claims the benefit of Chinese Patent Application No. 201510600874.5, filed on Sep. 17, 2015, which are hereby incorporated by reference in their entirety.

TECHNICAL FIELD

Embodiments of the present disclosure relate to, but are not limited to, wireless communication technologies and, in particular, to a channel access method, an access point and a station in a wireless local area network.

BACKGROUND

With the continuous expansion of the Wireless Local Area Network (WLAN) industry, the load of WLAN networks is increasing. In addition, as the number of users increases, a scenario of a dense network causes a significant drop of the efficiency of the WLAN network. The above problem cannot be solved by simply raising the transmission rate. As an alternative technology to solve the problem of low network efficiency, multi-user parallel transmission has raised extensive concern and undergone research.

In the related art, multi-user parallel transmission technologies include the Multi-User Multiple-Input Multiple-Output (MU-MIMO) technology and the Orthogonal Frequency Division Multiple Access (OFDMA) technology. MU-MIMO utilizes the Spatial Multiplexing technology to improve utilization of the time and frequency resources. The adoption of the OFDMA technology allows Frequency Division Multiplexing by multiple stations in the entire bandwidth, so as to more effectively use inter-station frequency selection results to improve the utilization of spectrum.

In a WLAN, a scenario where multiple non-access-point stations (non-AP STAs) send data to an access point (AP) at the same time is referred to as Uplink Multi-User (UL MU) transmission (users are equivalent to stations), while a scenario where the AP sends data to the multiple non-AP STAs at the same time is referred to as Downlink Multi-User (DL MU) transmission. FIG. 1 shows a frame switch sequence of a typical UL and DL MU transmission.

UL MU transmission is triggered by an AP. For example, a separate triggering frame is sent or a triggering information field is carried in a radio frame, so as to trigger the UL MU transmission. The triggering frame or the triggering information field includes scheduling information of a station, such as identification information of the station, information about time and frequency resources used by the station for uplink transmission, and time-frequency offset calibration information of the station. After the AP sends the triggering frame or the triggering information field, a station receives the triggering frame or the triggering information field. If the station determines that the triggering frame or the triggering information field carries the identification information of the station, the station is scheduled in this UL MU transmission. If the station is to send data, the station synchronizes according to the time-frequency offset calibration information indicated by the AP and sends the data on the allocated time and frequency resources.

In the WLAN, one AP and multiple non-AP STAs associated with the AP form a Basic Service Set (BSS). In general, one BSS is established for one AP and the identifier of the BSS (BSSID) is the Media Access Control (MAC) address of the AP. If the AP is capable of supporting multiple BSSIDs, one AP can be configured with multiple BSSs as shown in FIG. 2.

Therefore, in the scenario where the AP supports multiple BSSIDs, it is urgent to solve technical problems of how to indicate resources occupied by multicast and broadcast data of one or more BSSs in a BSS set of an AP in DL MU transmission and how to allocate channel access resources to a station when the AP triggers UL MU transmission of the station under the BSS in the BSS set.

SUMMARY

Embodiments of the present disclosure provide a channel access method, an access point and a station.

The following is a summary of the subject matter described herein in detail. This summary is not intended to limit the scope of the claims.

An embodiment of the present disclosure provides a channel access method applied to an access point. The method includes:

sending a radio frame to a station, where the radio frame carries a predefined identifier or a partial predefined identifier for indicating one or more BSSs in a BSS set of the access point.

In embodiments of the present disclosure, a predefined-identifier set is a subset of a station-association-identifier set, where a maximum number of predefined identifiers in the predefined-identifier set is m, where m is a positive integer less than or equal to s and s is a maximum number of station association identifiers in the station-association-identifier set.

In embodiments of the present disclosure, the predefined-identifier set includes a 0th value through an (m−1)th value in the station-association-identifier set.

In embodiments of the present disclosure, before sending the radio frame to the station, the method further includes: setting a correspondence between the predefined identifier and the BSS in the BSS set of the access point.

In embodiments of the present disclosure, before sending the radio frame to the station, the method further includes: setting a predefined identifier for indicating multiple BSSs in the predefined-identifier set, where the multiple BSSs refer to all BSSs in the BSS set.

In embodiments of the present disclosure, the partial predefined identifier is obtained by:

slicing the predefined identifier to obtain n bits of the predefined identifier; or calculating from the predefined identifier and the specific value; or calculating from the predefined identifier and the specific value, and slicing a calculation result to obtain n bits of the calculation result; or slicing the predefined identifier to obtain n bits of the predefined identifier, and calculating from the n bits of the predefined identifier and the specific value, where n is a positive integer.

In embodiments of the present disclosure, the method further includes:

when the radio frame carries resource allocation information of multicast and broadcast data of one BSS in the BSS set of the access point, using the predefined identifier or the partial predefined identifier of the one BSS to indicate the resource allocation information of the multicast and broadcast data.

In embodiments of the present disclosure, the method further includes:

when the radio frame carries resource allocation information of multicast and broadcast data of the multiple BSSs in the BSS set of the access point, using the predefined identifier of the multiple BSSs or the partial predefined identifier of the multiple BSSs to indicate the resource allocation information of the multicast and broadcast data.

In embodiments of the present disclosure, the method further includes:

when the radio frame carries resource allocation information of random access resources of one BSS in the BSS set of the access point, using the predefined identifier or the partial predefined identifier of the one BSS to indicate the resource allocation information of the random access resources.

In embodiments of the present disclosure, the method further includes:

when the radio frame carries resource allocation information of random access resources of the multiple BSSs in the BSS set of the access point, using the predefined identifier of the multiple BSSs or the partial predefined identifier of the multiple BSSs to indicate the resource allocation information of the random access resources.

In embodiments of the present disclosure, the method further includes:

before sending the radio frame, notifying the station of a value of m.

Another embodiment of the present disclosure provides a channel access method applied to a station. The method includes:

receiving a radio frame sent by an access point, where the radio frame carries a predefined identifier or a partial predefined identifier for indicating one or more BSSs in a BSS set of the access point.

In embodiments of the present disclosure, the method further includes:

before receiving the radio frame, acquiring a value m sent by the access point, where the value m is a maximum number of predefined identifiers in a predefined-identifier set, where m is a positive integer less than or equal to s and s is a maximum number of station association identifiers in a station-association-identifier set.

In embodiments of the present disclosure, the method further includes:

before receiving the radio frame, acquiring the predefined-identifier set.

In embodiments of the present disclosure, the method further includes:

before receiving the radio frame, acquiring a correspondence between the predefined identifier and the BSS in the BSS set of the access point.

In embodiments of the present disclosure, the method further includes:

before receiving the radio frame, acquiring a predefined identifier sent by the access point for indicating multiple BSSs in the predefined-identifier set.

In embodiments of the present disclosure, the method further includes:

before receiving the radio frame, acquiring a value n and/or a specific value for calculating the partial predefined identifier and calculating the partial predefined identifier according to the value n and/or the specific value, where n is a positive integer.

In embodiments of the present disclosure, calculating the partial predefined identifier according to the value n and/or the specific value includes:

slicing the predefined identifier to obtain n bits of the predefined identifier; or calculating from the predefined identifier and the specific value; or calculating from the predefined identifier and the specific value, and slicing a calculation result to obtain n bits of the calculation result; or slicing the predefined identifier to obtain n bits of the predefined identifier, and calculating from the n bits of the predefined identifier and the specific value, where n is a positive integer.

In embodiments of the present disclosure, the method further includes:

acquiring resource allocation information of multicast and broadcast data in the radio frame; and when identification information in the resource allocation information of the multicast and broadcast data is the predefined identifier or the partial predefined identifier of a BSS associated with the station, acquiring the multicast and broadcast data.

In embodiments of the present disclosure, the method further includes:

acquiring resource allocation information of multicast and broadcast data in the radio frame; and when identification information in the resource allocation information of the multicast and broadcast data is the predefined identifier of the multiple BSSs or the partial predefined identifier of the multiple BSSs, acquiring the multicast and broadcast data.

The multicast and broadcast data includes one of: a multicast and broadcast service, a broadcast frame, a multicast frame.

In embodiments of the present disclosure, the method further includes:

acquiring resource allocation information of random access resources in the radio frame; and when identification information in the resource allocation information of the random access resources is the predefined identifier or the partial predefined identifier of a BSS associated with the station, acquiring the resource allocation information of the random access resources; and when data is to be sent, performing contention-based access on resources indicated by the resource allocation information of the random access resources.

In embodiments of the present disclosure, the method further includes:

acquiring resource allocation information of random access resources in the radio frame; and when identification information in the resource allocation information of the random access resources is the predefined identifier of the multiple BSSs or a partial predefined identifier of the multiple BSSs, acquiring the resource allocation information of the random access resources; and when data is to be sent, performing contention-based access on resources indicated by the resource allocation information of the random access resources.

An embodiment of the present disclosure provides an access point, which includes:

a first sending unit, which is configured to send a radio frame to a station, where the radio frame carries a predefined identifier or a partial predefined identifier for indicating one or more BSSs in a BSS set of the access point.

In embodiments of the present disclosure, a predefined-identifier set is a subset of a station-association-identifier set, where a maximum number of predefined identifiers in the predefined-identifier set is m, where m is a positive integer less than or equal to s and s is a maximum number of station association identifiers in the station-association-identifier set.

In embodiments of the present disclosure, the predefined-identifier set includes a 0th value through an (m−1)th value in the station-association-identifier set.

In embodiments of the present disclosure, the access point further includes:

a first predefinition unit, which is configured to set a correspondence between the predefined identifier and the BSS in the BSS set of the access point.

In embodiments of the present disclosure, the access point further includes:

a second predefinition unit, which is configured to set a predefined identifier for indicating multiple BSSs in the predefined-identifier set, where the multiple BSSs refer to all BSSs in the BSS set.

In embodiments of the present disclosure, calculating the partial predefined identifier includes: slicing the predefined identifier to obtain n bits of the predefined identifier; or calculating from the predefined identifier and the specific value; or calculating from the predefined identifier and the specific value, and slicing a calculation result to obtain n bits of the calculation result; or slicing the predefined identifier to obtain n bits of the predefined identifier, and calculating from the n bits of the predefined identifier and the specific value, where n is a positive integer.

In embodiments of the present disclosure, the access point further includes:

a first indication unit, which is configured to, when the radio frame carries resource allocation information of multicast and broadcast data of one BSS in the BSS set of the access point, use the predefined identifier or the partial predefined identifier of the one BSS to indicate the resource allocation information of the multicast and broadcast data.

In embodiments of the present disclosure, the access point further includes:

a second indication unit, which is configured to, when the radio frame carries resource allocation information of multicast and broadcast data of the multiple BSSs in the BSS set of the access point, use the predefined identifier of the multiple BSSs or the partial predefined identifier of the multiple BSSs to indicate the resource allocation information of the multicast and broadcast data.

In embodiments of the present disclosure, the access point further includes:

a third indication unit, which is configured to, when the radio frame carries resource allocation information of random access resources of one BSS in the BSS set of the access point, use the predefined identifier or the partial predefined identifier of the one BSS to indicate the resource allocation information of the random access resources.

In embodiments of the present disclosure, the access point further includes:

a fourth indication unit, which is configured to, when the radio frame carries resource allocation information of random access resources of the multiple BSSs in the BSS set of the access point, use the predefined identifier of the multiple BSSs or the partial predefined identifier of the multiple BSSs to indicate the resource allocation information of the random access resources.

In embodiments of the present disclosure, the access point further includes:

a second sending unit, which is configured to, before the radio frame is sent, notify the station of a value of the m.

An embodiment of the present disclosure provides a station, which includes:

a receiving unit, which is configured to receive a radio frame sent by an access point, where the radio frame carries a predefined identifier or a partial predefined identifier for indicating one or more BSSs in a BSS set of the access point.

In embodiments of the present disclosure, the station further includes:

a first acquisition unit, which is configured to, before the radio frame is received, acquire a value m sent by the access point, where the value m is a maximum number of pre-defined identifiers in a predefined-identifier set, where m is a positive integer less than or equal to s and s is a maximum number of station association identifiers in a station-association-identifier set.

In embodiments of the present disclosure, the station further includes:

a second acquisition unit, which is configured to, before the radio frame is received, acquire the predefined-identifier set.

In embodiments of the present disclosure, the station further includes:

a third acquisition unit, which is configured to, before the radio frame is received, acquire a correspondence between the predefined identifier and the BSS in the BSS set of the access point.

In embodiments of the present disclosure, the station further includes:

a fourth acquisition unit, which is configured to, before the radio frame is received, acquire a predefined identifier sent by the access point for indicating multiple BSSs in the predefined-identifier set, where the multiple BSSs refer to all BSSs in the BSS set.

In embodiments of the present disclosure, the station further includes:

a fifth acquisition unit, which is configured to, before the radio frame is received, acquire a value n and/or a specific value for calculating the partial predefined identifier and calculate the partial predefined identifier according to the value n and/or the specific value, where n is a positive integer.

In embodiments of the present disclosure, calculating the partial predefined identifier by the fifth acquisition unit according to the value n and/or the specific value includes:

slicing the predefined identifier to obtain n bits of the predefined identifier; or calculating from the predefined identifier and the specific value; or calculating from the predefined identifier and the specific value, and slicing a calculation result to obtain n bits of the calculation result; or slicing the predefined identifier to obtain n bits of the predefined identifier, and calculating from the n bits of the predefined identifier and the specific value, where n is a positive integer.

In embodiments of the present disclosure, the station further includes:

a sixth acquisition unit, which is configured to acquire resource allocation information of multicast and broadcast data in the radio frame; and, when identification information in the resource allocation information of the multicast and broadcast data is the predefined identifier or the partial predefined identifier of a BSS associated with the station, acquire the multicast and broadcast data.

In embodiments of the present disclosure, the station further includes:

a seventh acquisition unit, which is configured to acquire resource allocation information of multicast and broadcast data in the radio frame; and, when identification information in the resource allocation information of the multicast and broadcast data is the predefined identifier of the multiple BSSs or the partial predefined identifier of the multiple BSSs, acquire the multicast and broadcast data.

The multicast and broadcast data includes one of: a multicast and broadcast service, a broadcast frame, a multicast frame.

In embodiments of the present disclosure, the station further includes:

an eighth acquisition unit, which is configured to acquire resource allocation information of random access resources in the radio frame; and, when identification information in the resource allocation information of the random access resources is the predefined identifier or the partial predefined identifier of a BSS associated with the station, acquire the resource allocation information of the random access resources; and a first access unit, which is configured to, when data is to be sent, perform contention-based access on resources indicated by the resource allocation information of the random access resources.

In embodiments of the present disclosure, the station further includes:

a ninth acquisition unit, which is configured to acquire resource allocation information of random access resources in the radio frame; and, when identification information in the resource allocation information of the random access resources is the predefined identifier of the multiple BSSs or the partial predefined identifier of the multiple BSSs, acquire the resource allocation information of the random access resources; and a second access unit, which is configured to, when data is to be sent, perform contention-based access on resources indicated by the resource allocation information of the random access resources.

In embodiments of the present disclosure, an access point sends a radio frame to a station, where the radio frame carries a predefined identifier or a partial predefined identifier indicating one or more BSSs in a BSS set of the access point. In the embodiments of the present disclosure, the access point supports multicast and broadcast data of the BSS in the BSS set in a scenario where the AP supports multiple BSSID and allows a simple and effective resource indication for indicating random access resources of the BSS in transmission through the Multi-User transmission technology.

Other aspects can be understood after reading and understanding of the accompanying drawings and detailed description.

BRIEF DESCRIPTION OF DRAWINGS

FIG. 5 is a schematic diagram of identification indication according to embodiment 1 of the present disclosure.

FIG. 6 is another schematic diagram of identification indication according to embodiment 1 of the present disclosure.

FIG. 7 is a schematic diagram of identification indication according to embodiment 2 of the present disclosure.

FIG. 8 is another schematic diagram of identification indication according to embodiment 2 of the present disclosure.

FIG. 9 is a schematic diagram of identification indication according to embodiment 3 of the present disclosure.

DETAILED DESCRIPTION

To provide a more detailed understanding of features and content of embodiments of the present disclosure, implementation of embodiments of the present disclosure is described below in detail with reference to the accompanying drawings. The accompanying drawings are provided for reference only and are not intended to limit embodiments of the present disclosure.

Figure 1:
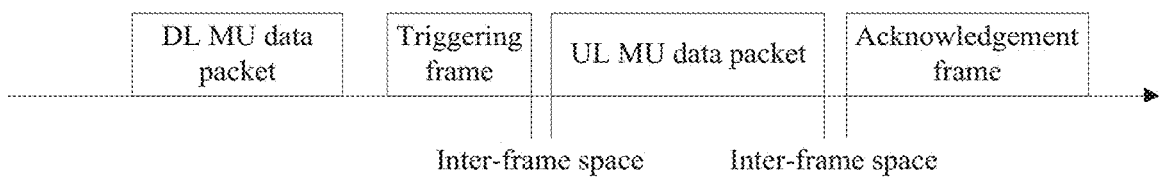
FIG. 1 is a schematic diagram illustrating a frame switch in a multi-user parallel transmission.
Figure 2:
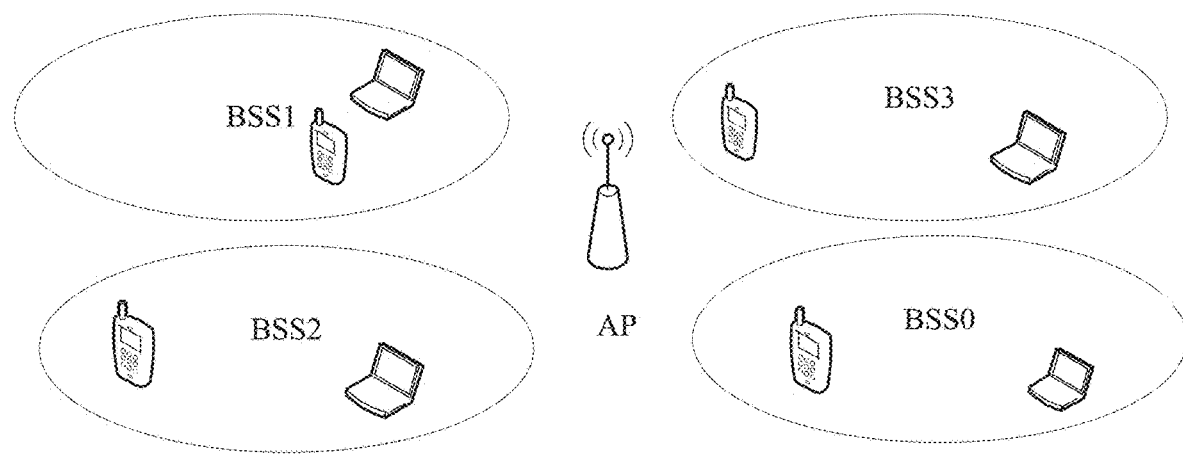
FIG. 2 is a schematic diagram illustrating multiple BSSs established for one AP.

As illustrated in FIG. 2, multiple BSSs, together with a BSS whose BSSID is a MAC address of an AP, form a BSS set of the AP. Service and security policies can be configured for each BSS in the set separately. The number of channels that do not overlap at all in license-free industrial, scientific and medical (ISM) bands is relatively small. In the case where each AP establishes a BSS separately, according to the principle of trying to prevent from overlapping with channels used by other APs, less channels are available, relatively large co-channel interference and adjacent-channel interference occur between APs. When one AP is provided with multiple BSSs (i.e., a same channel is used by multiple BSSs), the interferences are reduced. In addition, multiple BSSs in the BSS set are separately configured with service and security policies, so as to meet enterprise-level network requirements. For example, the security policy of a BSS used by visitors is set as Wired Equivalent Privacy (WEP) while the security policy of a BSS used by internal staff of an enterprise is set as Wi-Fi Protected Access2 (WPA2). Multiple BSSs actually correspond to one physical AP. This AP broadcasts parameter sets of its own BSS set in a beacon frame. Each BSS in the BSS set has a BSS parameter set that includes BSSID, SSID and capability information of the BSS.

Figure 3:
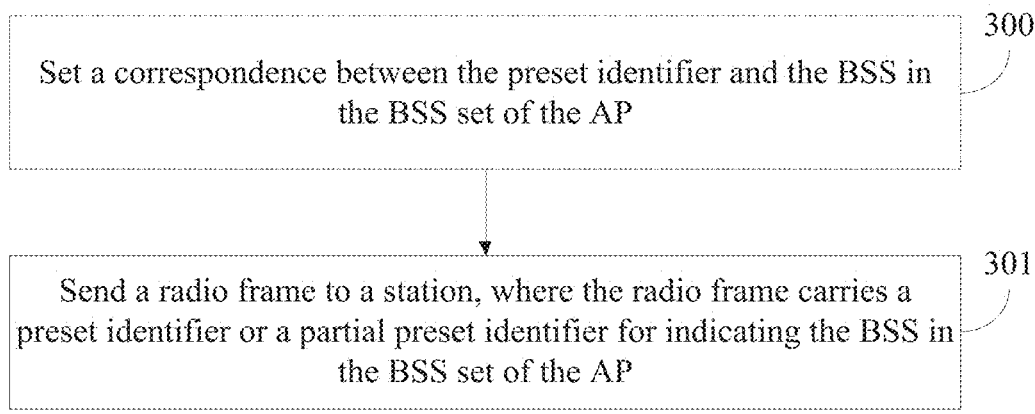
FIG. 3 is flowchart 1 of a channel access method according to an embodiment of the present disclosure.

FIG. 3 is flowchart 1 of a channel access method according to an embodiment of the present disclosure. The channel access method in this example is applied to an access point. As illustrated in FIG. 3, the channel access method includes the step described below.

In step 301, a radio frame is sent to a station, where the radio frame carries a predefined identifier or a partial predefined identifier for indicating one or more BSSs in a BSS set of the access point.

In embodiments of the present disclosure, a predefined-identifier set is a subset of a station-association-identifier set, where a maximum number of predefined identifiers in the predefined-identifier set is m, where m is a positive integer less than or equal to s and s is a maximum number of station association identifiers in the station-association-identifier set.

In embodiments of the present disclosure, the predefined-identifier set includes a 0th value through an (m−1)th value in the station-association-identifier set.

In embodiments of the present disclosure, the method further includes what is described below.

Before the radio frame is sent to the station, as illustrated in FIG. 3, the method further includes the step described below.

In step 300, a correspondence is set between the predefined identifier and the BSS in the BSS set of the access point.

In embodiments of the present disclosure, the method further includes what is described below.

Before the radio frame is sent to the station, the method further includes that a predefined identifier for indicating multiple BSSs in the predefined-identifier set is set, where the multiple BSSs refer to all BSSs in the BSS set.

In embodiments of the present disclosure, the partial predefined identifier is calculated by:

slicing the predefined identifier to obtain n bits of the predefined identifier; or calculating from the predefined identifier and the specific value; or calculating from the predefined identifier and the specific value, and slicing a calculation result to obtain n bits of the calculation result; or slicing the predefined identifier to obtain n bits of the present identifier, and calculating from the n bits of the predefined identifier and the specific value, where n is a positive integer.

In embodiments of the present disclosure, the method further includes:

when the radio frame carries resource allocation information of multicast and broadcast data of one BSS in the BSS set of the access point, a predefined identifier or a partial predefined identifier of the one BSS is used to indicate the resource allocation information of the multicast and broadcast data.

In embodiments of the present disclosure, the method further includes:

when the radio frame carries resource allocation information of multicast and broadcast data of the multiple BSSs in the BSS set of the access point, the predefined identifier of the multiple BSSs or a partial predefined identifier of the multiple BSSs is used to indicate the resource allocation information of the multicast and broadcast data.

In embodiments of the present disclosure, the method further includes:

when the radio frame carries resource allocation information of random access resources of one BSS in the BSS set of the access point, a predefined identifier or a partial predefined identifier of the one BSS is used to indicate the resource allocation information of the random access resources.

In embodiments of the present disclosure, the method further includes:

when the radio frame carries resource allocation information of random access resources of the multiple BSSs in the BSS set of the access point, the predefined identifier of the multiple BSSs or a partial predefined identifier of the multiple BSSs is used to indicate the resource allocation information of the random access resources.

In embodiments of the present disclosure, the method further includes:

before the radio frame is sent, a value of m is notified to the station.

Figure 4:
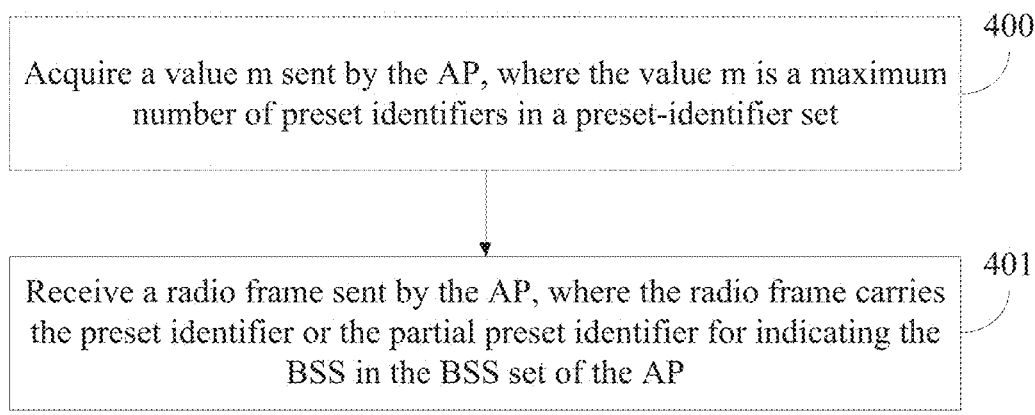
FIG. 4 is flowchart 2 of a channel access method according to an embodiment of the present disclosure.

FIG. 4 is flowchart 2 of a channel access method according to an embodiment of the present disclosure. The channel access method in this example is applied to a station. As illustrated in FIG. 4, the channel access method includes the step described below.

In step 401, a radio frame sent by an access point is received, where the radio frame carries a predefined identifier or a partial predefined identifier indicating one or more BSSs in a BSS set of the access point.

In embodiments of the present disclosure, as illustrated in FIG. 4, the method further includes the step described below.

In step 400, before the radio frame is received, a value m sent by the access point is acquired, where the value m is a maximum number of predefined identifiers in a predefined-identifier set, where m is a positive integer less than or equal to s and s is a maximum number of station association identifiers in a station-association-identifier set.

In embodiments of the present disclosure, the method further includes:

before the radio frame is received, the predefined-identifier set is acquired.

In embodiments of the present disclosure, the method further includes:

before the radio frame is received, a correspondence between the predefined identifier and the BSS in the BSS set of the access point is acquired.

In embodiments of the present disclosure, the method further includes:

before the radio frame, a predefined identifier sent by the access point for indicating multiple BSSs in the predefined-identifier set is acquired.

In embodiments of the present disclosure, the method further includes:

before the radio frame is received, a value n and/or a specific value for calculating the partial predefined identifier is acquired, and the partial predefined identifier is calculated according to the value n and/or the specific value, where n is a positive integer.

The partial predefined identifier is calculated according to the value n and/or the specific value by:

slicing the predefined identifier to obtain n bits of the predefined identifier; or calculating from the predefined identifier and the specific value; or calculating from the predefined identifier and the specific value, and slicing a calculation result to obtain n bits of the calculation result; or slicing the predefined identifier to obtain n bits of the predefined identifier, and calculating from the n bits of the predefined identifier and the specific value, where n is a positive integer.

In embodiments of the present disclosure, the method further includes:

resource allocation information of multicast and broadcast data in the radio frame is acquired; and when identification information in the resource allocation information of the multicast and broadcast data is the predefined identifier or the partial predefined identifier of a BSS associated with the station, the multicast and broadcast data is acquired.

In embodiments of the present disclosure, the method further includes:

resource allocation information of multicast and broadcast data in the radio frame is acquired; and when identification information in the resource allocation information of the multicast and broadcast data is the predefined identifier of the multiple BSSs or the partial predefined identifier of the multiple BSSs, the multicast and broadcast data is acquired.

In embodiments of the present disclosure, the method further includes:

resource allocation information of random access resources in the radio frame is acquired; and when identification information in the resource allocation information of the random access resources is the predefined identifier or the partial predefined identifier of a BSS associated with the station, the resource allocation information of the random access resources is acquired; and when data is to be sent, contention-based access is performed on resources indicated by the resource allocation information of the random access resources.

The multicast and broadcast data includes one of: a multicast and broadcast service, a broadcast frame, a multicast frame.

In embodiments of the present disclosure, the method further includes:

resource allocation information of random access resources in the radio frame is acquired; and when identification information in the resource allocation information of the random access resources is the predefined identifier of the multiple BSSs or the partial predefined identifier of the multiple BSSs, the resource allocation information of the random access resources is acquired; and when data is to be sent, contention-based access is performed on resources indicated by the resource allocation information of the random access resources.

Embodiments of the present disclosure are described below in detail with reference to specific application scenarios. It is to be understood that the embodiments described below are intended to explain and not to limit the present disclosure. If not in collision, the embodiments described herein and the features thereof may be combined with each other.

Scenario 1

In this scenario, the AP notifies itself that the AP has the multiple BSSID capability through a Beacon frame and a Probe Response frame sent by the AP, and carries a parameter set of a BSS of the AP in the Beacon frame and the Probe Response frame. The station is associated with a certain BSS in the BSS set of the AP. In the association process, the AP allocates an association identifier (AID) to the station.

Since the AP has the multiple BSSID capability, the AP notifies the station of the value of m, and reserves, in the station AID set, m values as the predefined identifiers of the BSSs in the BSS set. Among the m values, one value is used as the identifier of the multiple BSSs and each of the remaining (m−1) values is used to indicate a respective one of the BSSs in the BSS set of the AP. The identifier of the multiple BSSs identifies all BSSs in the BSS set of the AP.

The AP may directly notify the station of the value of m or may notify the station of necessary parameters for calculating the value of m. The value of m is calculated using a predefined algorithm between the AP and the station.

The AP may select, from the AID set, any m values as predefined identifiers, and needs to notify the station of the selected values. The AP may also reserve values, which are at fixed positions in the station AID set, as predefined identifiers by default. In a simple implementation, the AP reserves each of the 0th value to the (m−2)th value in the station AID set as the identifier of the respective one of the BSSs and reserves the (m−1)th value in the station AID set as the identifier of the multiple BSSs. m is a positive integer less than or equal to s and s is a maximum number of station AIDs in the station AID set. In another simple implementation, the AP reserves each of the 0th value to the (m−2)th value in the station AID set as the identifier of the respective one of the BSSs and reserves the last value in the station AID set as the identifier of the multiple BSSs.

The AP needs to notify the correspondence between the predefined identifiers and the BSSs in the BSS set. In a simple implementation, when the parameters of the multiple BSSs are configured, serial numbers are allocated to all the BSSs in an ascending order, and the identifiers of the BSSs are in the ascending order. As long as the AP notifies the station of the serial number of each BSS, the station acquires the identifier of the BSS. An example is provided below.

Assuming that the value of m is 16, the AP reserves, in the AID space, the first m values, i.e., the first 16 AIDs, for indicating the BSSs in the BSS set. Each of the first 15 AIDs corresponds to the respective one of BSSs in the BSS set. The 16th AID serves as the identifier of the multiple BSSs. The AP is currently configured with 4 BSSs. The AP establishes one BSS, i.e., BSS0, with the MAC address of the AP as the BSSID of this BSS. Other configured BSSs are BSS1, BSS2 and BSS3. BSSID, SSID and other capability information parameters are configured for each BSS. The serial numbers of the BSSs are 0, 1, 2 and 3 respectively. The AP notifies the value of m and parameters of BSSs in the BSS set, including BSSID and serial number of each BSS.

If a station associated with BSS1 acquires m, the station acquires the predefined-identifier set. The serial number of the BSS1 associated with the station is 1, so the station learns that the predefined identifier of BSS1 is the first value, i.e., AID1 in the AID set. The 16th AID, i.e., AID15, serves as the identifier of the multiple BSSs.

The AP sends multicast and broadcast data of multiple BSSs in the Downlink Multi-User transmission mode. For example, multicast and broadcast data of multiple BSSs is sent in parallel in the OFDMA mode. Specifically, the multicast and broadcast data may be a multicast and broadcast service or a broadcast frame or a multicast frame of multiple BSSs.

As illustrated in FIG. 5, when the AP sends in parallel the multicast and broadcast service of BSS0 and the multicast and broadcast service of BSS1, the AP uses the predefined identifier of BSS0 and the predefined identifier of BSS1, i.e., AID0 and AID1 (or the partial predefined identifier of AID0 and the partial predefined identifier of AID1) in the resource allocation information in the physical layer signaling field of the current frame to indicate the multicast and broadcast resources for BSS0 and the multicast and broadcast resources for BSS1, respectively. In addition, the AP also uses AIDs of station x and station y in the physical layer signaling field to indicate the downlink data that station x and station y need to receive. After receiving the radio frame, the station belonging to BSS0 acquires the identifier AID0 by parsing the resource allocation information in the physical layer signaling field. The station learns that the resource allocation information indicates the resources occupied by the multicast and broadcast service of BSS0, so that the station receives the multicast and broadcast service of BSS0 on the corresponding resources. Operations of BSS1 are similar to operations of BSS0.

The partial predefined identifier of AID0 or AID1 is n bits obtained by slicing AID0 or AID1; or is calculated from AID0 or AID1 and a specific value; or is n bits obtained by slicing a calculation result of calculating from AID0 or AID1 and the specific value; or is calculated from n bits, which is obtained by slicing the predefined identifier, and the specific value. If the partial predefined identifier of AID0 or AID1 is to be used for indicating resources, it is also needed to notify the station of the specific value and/or the value of n. n is a positive integer.

Similarly, as illustrated in FIG. 6, when the AP sends a broadcast triggering frame to stations belonging to BSS0 and BSS1 in the Downlink Multi-User transmission mode, AID0 and AID1 are also used to identify corresponding resource allocation information. The station belonging to BSS0 parses out the predefined identifier to acquire the BSS of the station (i.e., the resource position of the broadcast information of BSS0) and then receives the triggering frame on the corresponding resources. Operations of the station belonging to BSS1 are similar to operations of the station belonging to BSS0.

Scenario 2

Similar to the scenario in the above embodiment, assuming that the value of m is 16, the AP reserves, in the AID space, the first 16 AIDs for indicating the BSSs in the BSS set. Each of the first 15 AIDs corresponds to the respective one of BSSs in the BSS set. The 16th AID serves as the identifier of the multiple BSSs. The AP is currently configured with 4 BSSs. The AP establishes one BSS, i.e., BSS0, with the MAC address of the AP as the BSSID of this BSS.

Other configured BSSs are BSS1, BSS2 and BSS3. BSSID, SSID and other capability information parameters are configured for each BSS. The serial numbers of the BSSs are 0, 1, 2 and 3 respectively. The AP notifies the value of m and parameters of BSSs in the BSS set, including BSSID and serial number of each BSS.

If a station associated with BSS1 acquires m, the station acquires the predefined-identifier set. The serial number of the BSS1 associated with the station is 1, so the station learns that the predefined identifier of BSS1 is the first value, i.e., AID1 in the AID set. The 16th AID, i.e., AID15, serves as the identifier of the multiple BSSs.

In this embodiment, the AP sends multicast and broadcast data in the OFDMA mode. The multicast and broadcast data, which needs to be received by stations under all BSSs (i.e., BSS0 to BSS3) in the BSS set of the AP, may be a multicast and broadcast service or a radio frame (or referred to as a triggering frame) for the station to perform uplink transmission.

As illustrated in FIG. 7, when the AP sends the multicast and broadcast service that needs to be received by stations under BSS0 to BSS3, the AP uses the predefined identifier AID15 (or the partial predefined identifier of AID15) of the multiple BSSs in the resource allocation information in the physical layer signaling field of the current frame to indicate resources. After receiving the radio frame, the stations belonging to BSS0 to BSS3 acquire the identifier AID15 by parsing the resource allocation information in the physical layer signaling field. The stations learn that resources allocated in the resource allocation information are occupied by the multicast and broadcast service that needs to be received by the stations so that the stations receive the multicast and broadcast service on the corresponding resources. In this embodiment, downlink data of station x and downlink data of station y are sent in the downlink at the same time. Here station x and station y represent two different stations. After the AP sends an acknowledgement request frame, the two stations send acknowledgement frames in parallel in the UL MU mode.

Similarly, as illustrated in FIG. 8, when the AP sends the triggering frame for triggering UL MU transmission of the stations under BSS0 to BSS3, the AP uses the predefined identifier AID15 of the multiple BSSs in the resource allocation information in the physical layer signaling field of the current frame to indicate resources. After receiving the radio frame, the stations belonging to BSS0 to BSS3 acquire the identifier AID15 by parsing the resource allocation information in the physical layer signaling field. The stations learn that the triggering frame to be received exists on the resources allocated in the resource allocation information, and then receive the triggering frame.

Scenario 3

Similar to the scenario in the above embodiment, the AP reserves, in the AID space, the first 16 AIDs for indicating the BSSs in the BSS set. Each of the first 15 AIDs corresponds to the respective one of BSSs in the BSS set. The 16th AID serves as the identifier of the multiple BSSs. The AP is currently configured with 4 BSSs, i.e., BSS0, BSS1, BSS2 and BSS3. BSSID, SSID and other capability information parameters are configured for each BSS. The serial numbers of the BSSs are 0, 1, 2 and 3 respectively. The AP notifies the value of m and parameters of BSSs in the BSS set, including BSSID and serial number of each BSS.

In the scenario of this embodiment, as illustrated in FIG. 9, the AP uses the predefined identifier of each BSS to indicate the random access resources for each BSS in the resource allocation information in a triggering frame. For example, the AP uses AID0 (or the partial predefined identifier of AID0) to indicate the random access resources for BSS0. The station belonging to BSS0 receives the triggering frame and parses the resource allocation information in the triggering frame. In a case where the identifier in the resource allocation information is the predefined identifier of the BSS associated with the station, when data is to be sent, contention-based access is performed on the resources indicated by the allocation information of random access resources. In this embodiment, the AP also carries, in the triggering frame, the station association identifier of station1 (STA1) of BSS0, and STA1 sends uplink data in the parallel multi-user mode as instructed by the AP.

Scenario 4

Figure 10:
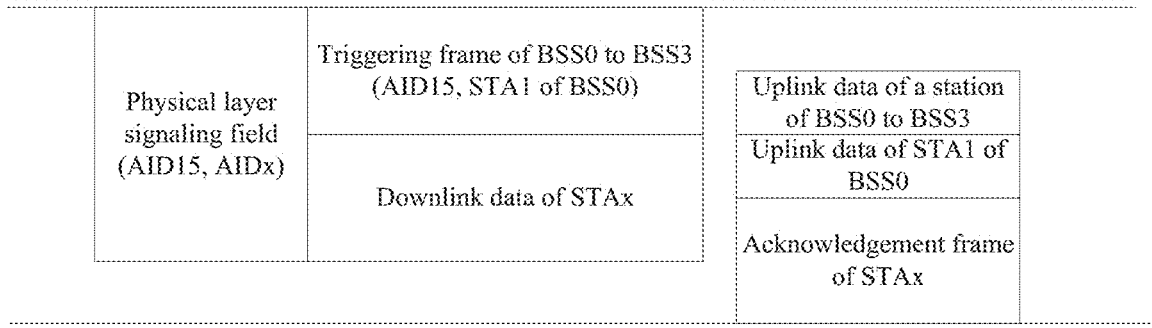
FIG. 10 is a schematic diagram of identification indication according to embodiment 4 of the present disclosure.

In this scenario, as illustrated in FIG. 10, the AP uses the predefined identifier AID15 (or the partial predefined identifier of AID15) of the multiple BSSs in the resource allocation information in a triggering frame to indicate the random access resources accessible to stations under all BSSs in the BSS set of the AP. The stations belonging to each BSS receive the triggering frame and parse the resource allocation information in the triggering frame. In a case where the identifier in the resource allocation information is the predefined identifier of the multiple BSSs, when data is to be sent, all the stations under all BSSs can perform contention-based access on the resources indicated by the allocation information of random access resources. The station that succeeds in the contention-based access occupies the resources and sends uplink data on the resources.

Scenario 5

Figure 11:
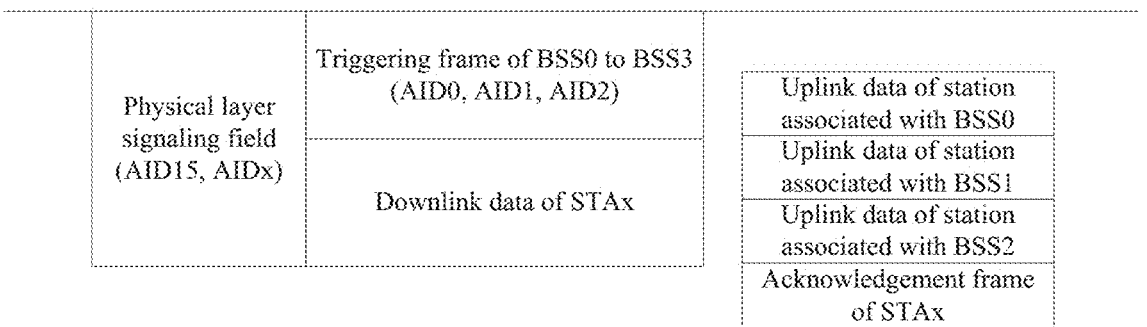
FIG. 11 is a schematic diagram of identification indication according to embodiment 5 of the present disclosure.

In this scenario, as illustrated in FIG. 11, the AP uses the predefined identifier of each BSS in the resource allocation information in a triggering frame to indicate the random access resources for each BSS in the BSS set of the AP. The stations belonging to each BSS receive the triggering frame and parse the resource allocation information in the triggering frame. In a case where the identifier in the resource allocation information is the predefined identifier of each BSS, when data is to be sent, the stations under each BSS perform contention-based access on the resources indicated by the allocation information of random access resources of each BSS.

Scenario 6

Figure 12:
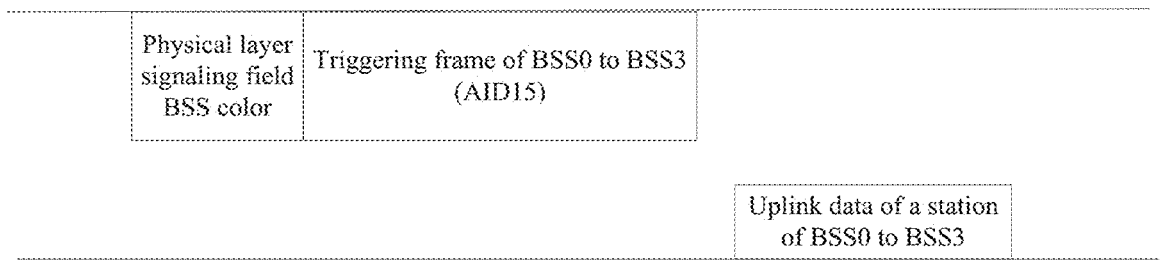
FIG. 12 is a schematic diagram of identification indication according to embodiment 6 of the present disclosure.

In this scenario, as illustrated in FIG. 12, the AP sends a triggering frame to trigger Uplink Multi-User transmission. The triggering frame is sent in the Downlink Single-User mode. The physical layer signaling field of the triggering frame carries identification information of a BSS, e.g., a BSS color, to inform the station whether the current triggering frame is the frame of the BSS to which the station belongs. When the current triggering frame is the frame of the BSS, the station continues receiving the triggering frame.

The predefined identifier AID15 (or the partial predefined identifier of AID15) in the resource allocation information in the triggering frame is used to indicate the random access resources accessible to stations under all BSSs in the BSS set of the AP. In a case where the identifier that is in the resource allocation information and read out by the stations belonging to each BSS is the predefined identifier of each BSS, when data is to be sent, all the stations under all BSSs can perform contention-based access on the resources indicated by the allocation information of random access resources. The station that succeeds in the contention-based access occupies the resources and sends uplink data on the resources.

Scenario 7

Figures 13, 14:
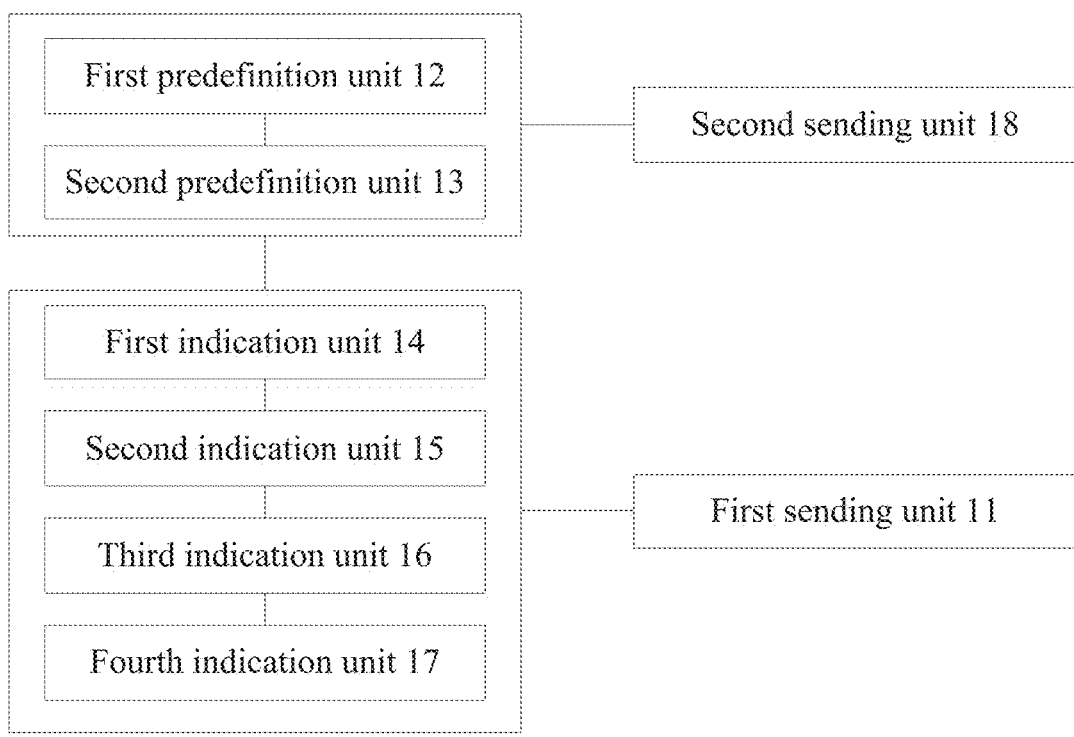
FIG. 13 is a schematic diagram of identification indication according to embodiment 7 of the present disclosure.
FIG. 14 is a structure diagram of an access point according to an embodiment of the present disclosure.

In this scenario, as illustrated in FIG. 13, the AP sends a triggering frame to trigger Uplink Multi-User transmission. The triggering frame is sent in the Downlink Single-User mode. The physical layer signaling field of the triggering frame carries BSS color to inform the station whether the current triggering frame is the frame of the BSS. When the current triggering frame is the frame of the BSS, the station continues receiving this triggering frame.

The predefined identifier of each BSS is used in the resource allocation information in the triggering frame to indicate the random access resources for each BSS in the BSS set of the AP. The stations belonging to each BSS receive the triggering frame and parse the resource allocation information in the triggering frame. In a case where the identifier in the resource allocation information is the predefined identifier of each BSS, when data is to be sent, the stations under each BSS perform contention-based access on the resources indicated by the allocation information of random access resources of each BSS.

Based on the description of the foregoing method embodiments, the following describes device embodiments for implementing the foregoing methods.

FIG. 14 is a structure diagram of an access point according to an embodiment of the present disclosure. The access point provided by embodiments of the present disclosure has multiple different BSSs. As illustrated in FIG. 14, the access point includes:

a first sending unit 11, which is configured to send a radio frame to a station, where the radio frame carries a predefined identifier or a partial predefined identifier for indicating one or more BSSs in a BSS set of the access point.

In embodiments of the present disclosure, a predefined-identifier set is a subset of a station-association-identifier set, where a maximum number of predefined identifiers in the predefined-identifier set is m, where m is a positive integer less than or equal to s and s is a maximum number of station association identifiers in the station-association-identifier set.

In embodiments of the present disclosure, the predefined-identifier set includes a 0th value through an (m−1)th value in the station-association-identifier set.

In embodiments of the present disclosure, the access point further includes:

a first predefinition unit 12, which is configured to set a correspondence between the predefined identifier and the BSS in the BSS set of the access point.

In embodiments of the present disclosure, the access point further includes:

a second predefinition unit 13, which is configured to set a predefined identifier for indicating multiple BSSs in the predefined-identifier set, where the multiple BSSs refer to all BSSs in the BSS set.

In embodiments of the present disclosure, the partial predefined identifier is obtained by: slicing the predefined identifier to obtain n bits of the predefined identifier; or calculating from the predefined identifier and the specific value; or calculating from the predefined identifier and the specific value, and slicing a calculation result to obtain n bits of the calculation result; or slicing the predefined identifier to obtain n bits of the present identifier, and calculating from the n bits of the predefined identifier and the specific value, where n is a positive integer.

In embodiments of the present disclosure, the access point further includes:

a first indication unit 14, which is configured to, when the radio frame carries resource allocation information of multicast and broadcast data of one BSS in the BSS set of the access point, use the predefined identifier or the partial predefined identifier of the one BSS to indicate the resource allocation information of the multicast and broadcast data.

In embodiments of the present disclosure, the access point further includes:

a second indication unit 15, which is configured to, when the radio frame carries resource allocation information of multicast and broadcast data of the multiple BSSs in the BSS set of the access point, use the predefined identifier of the multiple BSSs or the partial predefined identifier of the multiple BSSs to indicate the resource allocation information of the multicast and broadcast data.

In embodiments of the present disclosure, the access point further includes:

a third indication unit 16, which is configured to, when the radio frame carries resource allocation information of random access resources of one BSS in the BSS set of the access point, use the predefined identifier or the partial predefined identifier of the one BSS to indicate the resource allocation information of the random access resources.

In embodiments of the present disclosure, the access point further includes:

a fourth indication unit 17, which is configured to, when the radio frame carries resource allocation information of random access resources of the multiple BSSs in the BSS set of the access point, use the predefined identifier of the multiple BSSs or the partial predefined identifier of the multiple BSSs to indicate the resource allocation information of the random access resources.

In embodiments of the present disclosure, the access point further includes:

a second sending unit 18, which is configured to, before the radio frame is sent, notify the station of a value of the m.

It is to be understood by those skilled in the art that functions implemented by various units of the access point of FIG. 14 may be understood with reference to the description of the foregoing channel access method. The functions of the various units of the access point of FIG. 14 may be implemented by one or more programs running on a processor or by one or more specific logic circuits.

Figure 15:
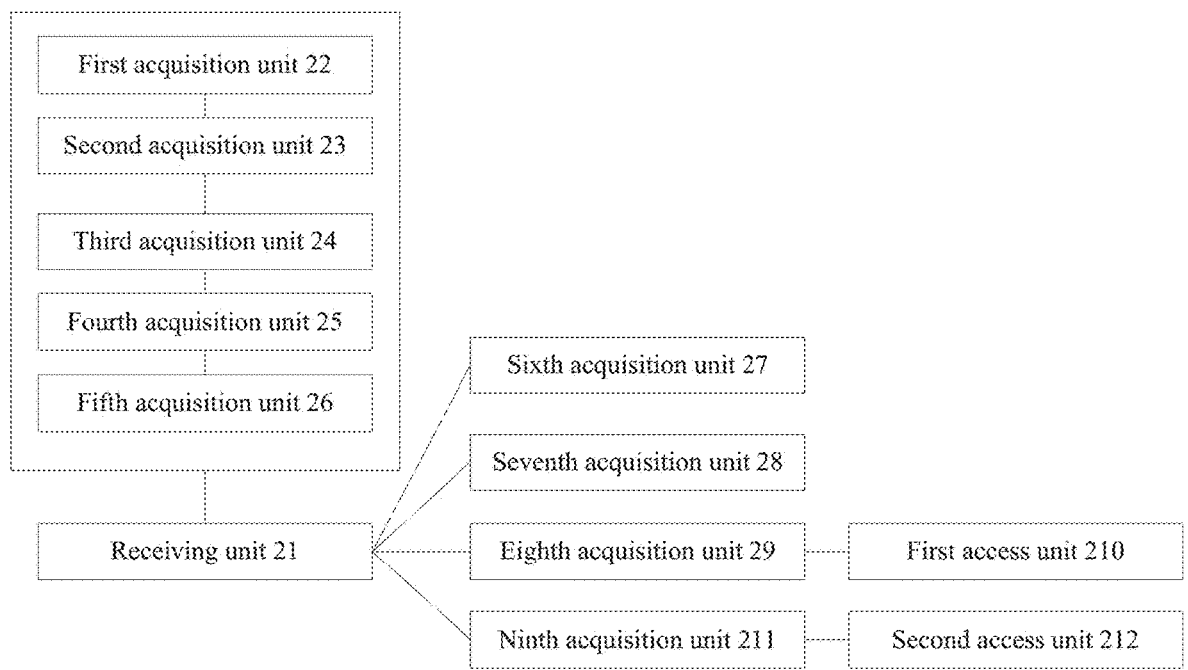
FIG. 15 is a structure diagram of a station according to an embodiment of the present disclosure.

FIG. 15 is a structure diagram of a station according to an embodiment of the present disclosure. As illustrated in FIG. 15, the station includes:

a receiving unit 21, which is configured to receive a radio frame sent by an access point, where the radio frame carries a predefined identifier or a partial predefined identifier for indicating one or more BSSs in a BSS set of the access point.

In embodiments of the present disclosure, the station further includes:

a first acquisition unit 22, which is configured to, before the radio frame is received, acquire a value m sent by the access point, where the value m is a maximum number of predefined identifiers in a predefined-identifier set, where m is a positive integer less than or equal to s and s is a maximum number of station association identifiers in a station-association-identifier set.

In embodiments of the present disclosure, the station further includes:

a second acquisition unit 23, which is configured to, before the radio frame is received, acquire the predefined-identifier set.

In embodiments of the present disclosure, the station further includes:

a third acquisition unit 24, which is configured to, before the radio frame is received, acquire a correspondence between the predefined identifier and the BSS in the BSS set of the access point.

In embodiments of the present disclosure, the station further includes:

a fourth acquisition unit 25, which is configured to, before the radio frame is received, acquire a predefined identifier sent by the access point for indicating multiple BSSs in the predefined-identifier set, where the multiple BSSs refer to all BSSs in the BSS set.

In embodiments of the present disclosure, the station further includes:

a fifth acquisition unit 26, which is configured to, before the radio frame is received, acquire a value n and/or a specific value for calculating the partial predefined identifier and calculate the partial predefined identifier according to the value n and/or the specific value, where n is a positive integer.

The calculating the partial predefined identifier according to the value n and/or the specific value includes:

slicing the predefined identifier to obtain n bits of the predefined identifier; or calculating from the predefined identifier and the specific value; or calculating from the predefined identifier and the specific value, and slicing a calculation result to obtain n bits of the calculation result; or slicing the predefined identifier to obtain n bits of the predefined identifier, and calculating from the n bits of the predefined identifier and the specific value, where n is a positive integer.

In embodiments of the present disclosure, the station further includes:

a sixth acquisition unit 27, which is configured to acquire resource allocation information of multicast and broadcast data in the radio frame; and, when identification information in the resource allocation information of the multicast and broadcast data is the predefined identifier or the partial predefined identifier of a BSS associated with the station, acquire the multicast and broadcast data.

In embodiments of the present disclosure, the station further includes:

a seventh acquisition unit 28, which is configured to acquire resource allocation information of multicast and broadcast data in the radio frame; and, when identification information in the resource allocation information of the multicast and broadcast data is the predefined identifier of the multiple BSSs or the partial predefined identifier of the multiple BSSs, acquire the multicast and broadcast data.

The multicast and broadcast data includes: a multicast and broadcast service, or a broadcast frame, or a multicast frame.

In embodiments of the present disclosure, the station further includes:

an eighth acquisition unit 29, which is configured to acquire resource allocation information of random access resources in the radio frame; and, when identification information in the resource allocation information of the random access resources is the predefined identifier or the partial predefined identifier of a BSS associated with the station, acquire the resource allocation information of the random access resources; and a first access unit 210, which is configured to, when data is to be sent, perform contention-based access on resources indicated by the resource allocation information of the random access resources.

In embodiments of the present disclosure, the station further includes:

a ninth acquisition unit 211, which is configured to acquire resource allocation information of random access resources in the radio frame; and, when identification information in the resource allocation information of the random access resources is the predefined identifier of the multiple BSSs or the partial predefined identifier of the multiple BSSs, acquire the resource allocation information of the random access resources; and a second access unit 212, which is configured to, when data is to be sent, perform contention-based access on resources indicated by the resource allocation information of the random access resources.

It is to be understood by those skilled in the art that functions implemented by various units of the station of FIG. 15 may be understood with reference to the description of the foregoing channel access method. The functions of the various units of the station of FIG. 15 may be implemented by one or more programs running on a processor or by one or more specific logic circuits.

If not in collision, the embodiments of the present disclosure may be combined with each other.

It is to be understood that the methods and smart devices disclosed by embodiments of the present disclosure may be implemented in other ways. The device embodiments described above are merely exemplary. For example, the unit division is merely logical function division, and, in practice, the unit division may be implemented in other ways. For example, multiple units or components may be combined or may be integrated into another system, or some features may be omitted or not executed. Additionally, the presented or discussed coupling, direct coupling or communication connection between components may be indirect coupling or communication connection made between devices or units via interfaces, and may be electrical, mechanical or in other forms.

The units described above as separate components may or may not be physically separated. Components presented as units may or may not be physical units, i.e., may be located in one place or may be distributed over multiple network units. Part or all of these units may be selected according to actual requirements.

Moreover, various function units in embodiments of the present disclosure may all be integrated in one second processing unit, or each unit may be used as a separate unit, or two or more units may be integrated into one unit. The integrated function unit may be implemented by hardware or may be implemented by hardware plus a software function unit.

The above are only specific embodiments of the present disclosure and are not intended to limit the present disclosure. It is easy for those skilled in the art to conceive modifications or substitutions within the technical scope of the present disclosure. These modifications or substitutions are within the scope of the present disclosure.

INDUSTRIAL APPLICABILITY

The present disclosure provides a channel access method, an access point and a station. The method includes that an access point sends a radio frame to a station, where the radio frame carries a predefined identifier or a partial predefined identifier indicating one or more BSSs in a BSS set of the access point. In the embodiments of the present disclosure, the access point supports multicast and broadcast data of the BSS in the BSS set in a scenario where the AP supports multiple BSSID and allows a simple and effective resource indication for indicating random access resources of the BSS in the Multi-User transmission technology.

What is claimed is:

1. A channel access method configured for an access point (AP), comprising:
   configuring multiple basic service sets (BSSs) as part of a BSS set of the AP, wherein the configuring allows usage of a same channel by the multiple BSSs in the BSS set; and
   notifying, by the AP, an integer value m corresponding to a maximum number of predefined AIDs in a predefined-identifier set, wherein, among m values, one value is used for identifying all of the multiple BSSs in the BSS set of the AP and each of the remaining (m−1) values is used to indicate a respective one of the BSSs in the BSS set of the AP;
   sending, to a station, a radio frame comprising information relating to at least one basic service set (BSS) in the BSS set of the AP,
   wherein the radio frame is a frame of the at least one BSS and carries a predefined BSS color identifier for identifying whether the radio frame is associated with the at least one BSS in the BSS set and at least one of: a predefined association identifier (AID) for identifying the at least one BSS in the BSS set and a predefined AID for identifying all of the multiple BSSs in the BSS set.

2. The channel access method of claim 1, wherein the radio frame carries resource allocation information of multicast and broadcast data for one BSS in the BSS set of the AP, and the predefined AID for identifying the at least one BSS in the BSS set corresponds to the at least one BSS.

3. The channel access method of claim 1, wherein the radio frame carries resource allocation information of multicast and broadcast data for the multiple BSSs in the BSS set of the AP, and the predefined AID for identifying all of the multiple BSSs in the BSS set corresponds to the multiple BSSs.

4. The channel access method of claim 1, wherein the radio frame carries resource allocation information of random access resources for one BSS in the BSS set of the AP, and the predefined identifier for identifying the at least one BSS in the BSS set corresponds to the at least one BSS.

5. The channel access method of claim 1, wherein the radio frame carries resource allocation information of random access resources for the multiple BSSs in the BSS of the AP, and the predefined AID for identifying all of the multiple BSSs in the BSS set corresponds to the multiple BSSs.

6. A channel access method configured for a station, comprising:
   acquiring information relating to at least one basic service set (BSS) in a BSS set comprising multiple BSSs of an access point (AP), wherein the multiple BSSs are configured to allow usage of a same channel by the multiple BSSs in the BSS set;
   receiving, from the AP, an integer value m corresponding to a maximum number of predefined AIDs in a predefined-identifier set, wherein, among m values, one value is used for identifying all of the multiple BSSs in the BSS set of the AP and each of the remaining (m−1) values is used to indicate a respective one of the BSSs in the BSS set of the AP; and
   receiving a radio frame sent by the access point (AP),
   wherein the radio frame carries a predefined AID for identifying all of the multiple BSSs in the BSS set and at least one of: a predefined association identifier (AID) for identifying the at least one BSS in the BSS set and a predefined BSS color identifier for identifying whether the radio frame is associated with the at least one BSS in the BSS set.

7. The channel access method of claim 6, wherein the radio frame carries resource allocation information of multicast and broadcast data, further comprising:
   in response to determining that identification information in the resource allocation information of the multicast and broadcast data is the predefined identifier for identifying the at least one BSS in the BSS set corresponds to a BSS associated with the station, acquiring the multicast and broadcast data.

8. The channel access method of claim 6, wherein the radio frame carries resource allocation information of multicast and broadcast data, further comprising:
   in response to determining that identification information in the resource allocation information of the multicast and broadcast data is the predefined AID for identifying all of the multiple BSSs in the BSS set, acquiring the multicast and broadcast data.

9. The channel access method of claim 6, wherein the radio frame carries resource allocation information of random access resources, further comprising:
   in response to determining that identification information in the resource allocation information of the random access resources is the predefined identifier for identifying the at least one BSS in the BSS set corresponds to a BSS associated with the station, acquiring the resource allocation information of the random access resources; and
   performing contention-based access on channel access resources indicated by the resource allocation information of the random access resources for sending data to the access point.

10. The channel access method of claim 6,
wherein the radio frame carries resource allocation information of random access resources, further comprising:
in response to determining that identification information in the resource allocation information of the random access resources is the predefined AID for identifying all of the multiple BSSs in the BSS set, acquiring the resource allocation information of the random access resources; and
performing contention-based access on channel access resources indicated by the resource allocation information of the random access resources for sending data to the access point.

11. A non-transitory computer storage medium having computer-executable instructions stored thereon, which upon execution by a processor causes the processor at an access point (AP) to:
configure multiple basic service sets (BSSs) as part of a BSS set of the AP, wherein the multiple BSSs are configured to allow usage of a same channel by the multiple BSSs in the BSS set;
notify an integer value m corresponding to a maximum number of predefined AIDs in a predefined-identifier set, wherein, among m values, one value is used for identifying all of the multiple BSSs in the BSS set of the AP and each of the remaining (m−1) values is used to indicate a respective one of the BSSs in the BSS set of the AP; and
send, to a station, a radio frame comprising information relating to at least one basic service set (BSS) in the BSS set of the AP, wherein the radio frame carries a predefined AID for identifying all of the multiple BSSs in the BSS set and at least one of: a predefined association identifier (AID) for identifying the at least one BSS in the BSS set and a predefined BSS color identifier for identifying whether the radio frame is associated with the at least one BSS in the BSS set.

12. The non-transitory computer storage medium of claim 11, wherein the radio frame carries resource allocation information of multicast and broadcast data for one BSS in the BSS set of the AP, and the predefined AID for identifying the at least one BSS in the BSS set corresponds to the at least one BSS.

13. The non-transitory computer storage medium of claim 11, wherein the radio frame carries resource allocation information of multicast and broadcast data for the multiple BSSs in the BSS set of the AP, and the predefined AID for identifying all of the multiple BSSs in the BSS set corresponds to the multiple BSSs.

14. The non-transitory computer storage medium of claim 11, wherein the radio frame carries resource allocation information of random access resources for one BSS in the BSS set of the AP, and the predefined AID for identifying the at least one BSS in the BSS set corresponds to the at least one BSS.

15. The non-transitory computer storage medium of claim 11, wherein the radio frame carries resource allocation information of random access resources for the multiple BSSs in the BSS set of the AP, and the predefined AID for identifying all of the multiple BSSs in the BSS set corresponds to the multiple BSSs.

16. A non-transitory computer storage medium having computer-executable instructions stored thereon, which upon execution by a processor causes the processor at a station to:
acquire information relating to at least one basic service set (BSS) in a BSS set comprising multiple BSSs of an access point (AP), wherein the multiple BSSs are configured to allow usage of a same channel by the multiple BSSs in the BSS set;
receive, from the AP, an integer value m corresponding to a maximum number of predefined AIDs in a predefined-identifier set, wherein, among m values, one value is used for identifying all of the multiple BSSs in the BSS set of the AP and each of the remaining (m−1) values is used to indicate a respective one of the BSSs in the BSS set of the AP; and
receive a radio frame sent by the access point (AP),
wherein the radio frame carries a predefined AID for identifying all of the multiple BSSs in the BSS set and at least one of: a predefined association identifier (AID) for identifying the at least one BSS in the BSS set and a predefined BSS color identifier for identifying whether the radio frame is associated with the at least one BSS in the BSS set.

17. The channel access method of claim 1, wherein the multiple BSSs comprise all BSSs in the BSS set.

18. The channel access method of claim 6, wherein the multiple BSSs comprise all BSSs in the BSS set.

19. The non-transitory computer storage medium of claim 11, wherein the multiple BSSs comprise all BSSs in the BSS set.

20. The non-transitory computer storage medium of claim 16, wherein the multiple BSSs comprise all BSSs in the BSS set.

21. The channel access method of claim 1, wherein the predefined BSS color identifier is used to determine that the station belongs to the at least one BSS in the BSS set.

22. The non-transitory computer storage medium of claim 11, wherein the predefined BSS color identifier is used to determine that the station belongs to the at least one BSS in the BSS set.

23. The channel access method of claim 6, further comprising:
using, at the station, the predefined BSS color identifier to determine that the station belongs to the at least one BSS in the BSS set.

24. The non-transitory computer storage medium of claim 16, wherein the instructions further cause the processor to:
use, at the station, the predefined BSS color identifier to determine that the station belongs to the at least one BSS in the BSS set.

25. The channel access method of claim 1, wherein the maximum number of predefined AIDs in the predefined-identifier set is less than or equal to a maximum number of identifiers in the BSS set of the AP.

26. The channel access method of claim 1, wherein the predefined-identifier set includes a 0th value through an (m−1)th value of the BSS set of the AP, where m denotes the maximum number of predefined AIDs in the predefined-identifier set.

* * * * *